United States Patent [19]

Kowalchuk

[11] Patent Number: 5,130,846
[45] Date of Patent: Jul. 14, 1992

[54] SCREEN PANEL FASTENER

[75] Inventor: Kevin P. Kowalchuk, Oakville, Canada

[73] Assignee: Imax Corporation, Toronto, Canada

[21] Appl. No.: 728,417

[22] Filed: Jul. 11, 1991

[51] Int. Cl.⁵ ............................................. G03B 1/56
[52] U.S. Cl. ........................... 359/443; 359/451; 359/459
[58] Field of Search ............... 359/443, 451, 459; 52/578, 581, 589, 590

[56] References Cited

U.S. PATENT DOCUMENTS

| | | | |
|---|---|---|---|
| 4,057,323 | 11/1977 | Ward, Jr. | 359/451 |
| 4,277,136 | 7/1981 | Schudel | 359/451 |
| 4,318,589 | 3/1982 | Brown et al. | 359/451 |
| 4,580,361 | 4/1986 | Hillstrom et al. | 359/451 X |
| 4,641,918 | 2/1987 | Moffatt et al. | 359/451 |
| 4,750,807 | 6/1988 | Chamayou Dit Felix | 359/451 |
| 4,984,871 | 1/1991 | Martinez | 359/443 |
| 5,011,263 | 4/1991 | Hopper | 359/443 |

*Primary Examiner*—Richard A. Wintercorn
*Attorney, Agent, or Firm*—Bereskin & Parr

[57] ABSTRACT

A dome-shaped motion picture projection screen is constructed from an external supporting frame and a plurality of panels that are clipped to the frame by a series of individual fasteners that are hooked into the perforations in the panel and clamped to the frame. Each fastener has a L-shaped fastener body with a pair of hook-shaped pins that project from one end of one limb so that they can be hooked into the perforations in the panel. A screw extends through the other limb parallel to the first limb and can be tightened against a supporting frame member to secure the panel to the frame. By carefully controlling tightening of the screw, localized flattening of the panel at the positions of the hooks can be avoided. The ends of the hooks are so small as to be virtually invisible to the audience.

10 Claims, 3 Drawing Sheets

SCREEN PANEL FASTENER

FIELD OF THE INVENTION

This invention relates generally to motion picture projection screens and is concerned more specifically with a fastener for use in making such screens.

BACKGROUND OF THE INVENTION

The invention has been devised primarily in the context of dome-shaped projection screens. Screens of this type are typically constructed from a large number of individual screen panels secured to an external supporting frame, so that the inner surfaces of the panels form the actual projection screen surface. The panels are usually thin perforated aluminum sheets, each provided with a suitable reflective coating on its inner surface. The perforations allow sound to pass through the screen and have been found necessary to achieve acceptable acoustical performance in the theatre. In a typical theatre having a dome diameter of, say, 30 m, the screen may be constructed using 300–400 panels each having an initial size of approximately 3 m by 1 m. The panels are cut to match the configuration of the supporting frame.

DESCRIPTION OF THE PRIOR ART

Conventionally, the individual screen panels are fastened to the supporting frame by rivets. Each panel is cut to shape and positioned on the frame. Holes are then drilled through the panel and frame and the panel is rivetted to the frame through those holes. Usually, the panels are overlapped so that a hole is drilled through two adjacent panels and the frame so that a single series of rivets would provide support for both panels. On average, a typical panel may be supported by 200 rivets.

A number of disadvantages arise from this method of fastening the panels. The rivets tend to pull in and flatten portions of the panels near the frame, which slightly changes the curvature of the panel. If the screen has high-gain (highly reflective) properties, these slight changes in curvature can lead to a noticeable "seam" between the centre area of the panel (which will be quite bright) and the edge areas of the panel where the panel has been flattened (which will be noticeably darker). Also, the rivet heads can be seen and must be painted to match the appearance of the screen surface. Additionally, the procedure of drilling holes, riveting and painting the rivet heads is very labour intensive and costly. A still further disadvantage is that, once the panels have been rivetted in place, the screen cannot be dismantled in such a way as to allow the panels to be reused in another theatre.

United States patent literature contains a number of patents that directly or indirectly address the problem of visible seams in a dome or curved projection screen. However, the patented inventions do not appear to recognize the problem of flattening of panels that are rivetted to a support member.

Patent No. 3,594,964 (Clark) discloses the use of T-shaped cover strips at butt joints between screen panels that are joined together by opposing edge flanges on the panels.

Komitor (U.S. Pat. No. 3,237,517) discloses the use of panels that include a backing sheet with a plurality of long, narrow, vertical light-reflecting elements. The elements have a triangular, wedge-shaped cross-section and are arranged so that they overlap and hide the backing sheet.

The problem of visible seams where two adjacent screen panels overlap in a spherical dome screen is addressed by Patent No. 4,057,323 (Ward). The sharp edge of an overlapping panel is replaced by a more gradual tapering panel edge. Overlapping panels are also shown by Patent No. 4,750,807 (Chamayou dit Felix). However, the problem of visible seams is not addressed.

Brown et al. (Patent No. 4,381,589) discloses a segmented curved screen in which a depression or channel is formed at the junction between adjacent panels and is filled with filler and sanded to match precisely the curvature of adjacent screen panels.

Proposals to avoid seams by forming a screen surface using a deformable membrane are disclosed by British Patent No. 1,508,525 (Holzel) and U.S. Pat. No. 4,022,522 (Rain).

A screen formed by a plurality of individual screen strips which are made out of fabric and stretched and stapled onto wooden support frames that are in turn attached to a dome support structure is disclosed by U.S. Pat. No. 3,695,751 (Watanuki).

Also of interest are three patents issued to Jules Hourdiaux, namely U.S. Pat. Nos. 3,295,910; 3,384,432 and 3,348,897. These patents disclose a screen surface formed from vertical reflective strips. The strips are attached to panels having support members that control the orientation of the strips so that the faces of the strips can be maintained perpendicular to light from the projector. The panels are connected together by screw clamps.

BRIEF DESCRIPTION OF THE INVENTION

In one aspect, the invention provides a screen panel fastener for securing a screen panel having first and second faces to a support located at a first said face of the panel. The fastener includes a fastener body provided with panel engaging means, clamping means and bracing means. The panel engaging means is insertable from the first face of the panel into an opening through the panel adjacent the support and has an outer end portion shaped to project in a direction laterally of the opening at the second face of the panel while retaining the panel in engagement with the panel engaging means. The clamping means is adapted to engage the support at a location spaced laterally of the panel engaging means and includes a screw which can be tightened against the support to draw the panel towards the support. The bracing means is arranged for contact with the first face of the panel at a location spaced laterally of the panel engaging means in a direction opposite to the clamping means.

In other words, the clamping means and bracing means are arranged on opposite sides of the panel engaging means. The panel engaging means effectively hooks into an opening in the panel so that the panel is drawn towards the support when the screw of the clamping means is turned. The bracing means resists consequent rocking of the body member of the fastener about the panel engaging means.

A significant advantageous feature of the fastener provided by the invention is that it engages the panel wholly from the side of the panel that contacts the support, i.e. the reverse side opposite the reflective face onto which images are projected. The panel engaging means can be at least one slender pin that engages in the opening in the panel and has a small hook-shaped outer end portion for engaging the end of the opening at the second face of the panel so that the pin and its outer end portion are virtually invisible from the reflective (second) face of the panel. Where the screen is perforated, the "opening" referred to previously will be one of the screen perforations. Preferably, each fastener will be provided with two or possibly even three panel engaging "pins" which will be spaced to correspond with a multiple of the pitch of the perforations in the screen panel. The fastener can then be engaged with any convenient group of perforations appropriate to the location at which the panel is to be fastened. It is envisaged that each marginal portion of each panel will be secured to a support member at relatively closely spaced intervals, for example at every 15 cm. Since the panels typically are perforated quite extensively with a large number of small diameter perforations, the perforations provide an almost infinite range of possible positions for the fasteners. In other words, the fasteners can be positioned virtually anywhere there is a perceived need for the panel to be supported.

In another aspect, the invention provides a method of constructing a motion picture projection screen which includes the steps of providing a supporting frame and a plurality of screen panels, and fastening those panels to the frame using a plurality of fasteners of the form defined previously.

BRIEF DESCRIPTION OF DRAWINGS

Reference will now be made to the accompanying drawings which illustrate a particular preferred embodiment of the invention by way of example, and in which.

DESCRIPTION OF PREFERRED EMBODIMENT

Figure 1:
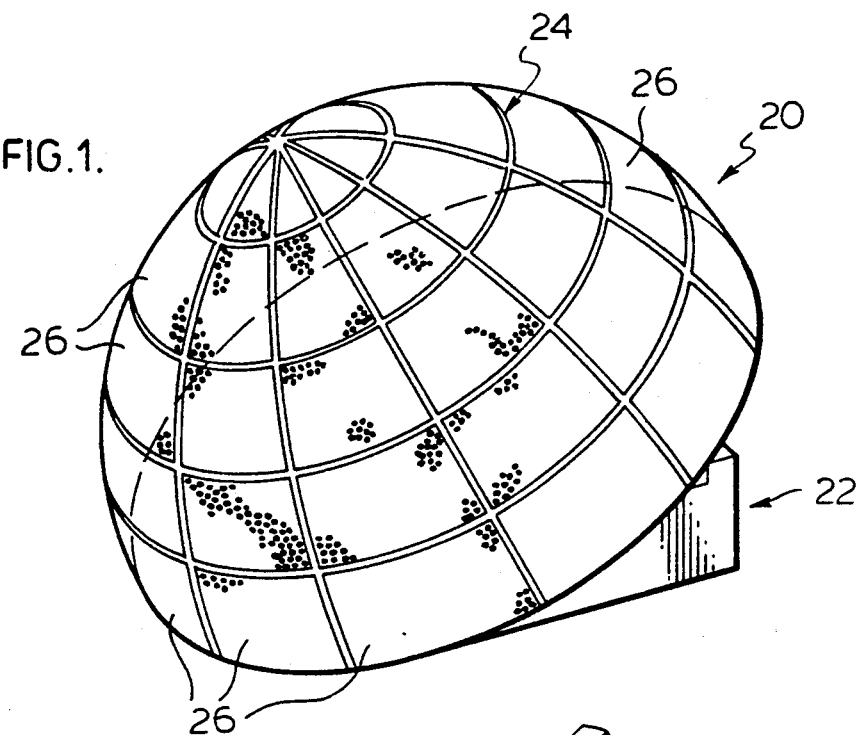
FIG. 1 is a simplified perspective view from above showing the external appearance of a dome-screen motion picture theatre illustrating the general structure of the screen.

Referring first to FIG. 1, a dome-shaped projection screen is generally denoted by reference numeral 20 and is shown supported in a tilted position by a base structure 22 that will house projection equipment and other facilities of the theatre (not shown). The screen is tilted for reasons of projection geometry that are irrelevant to the present invention. In fact, it should be noted that FIG. 1 is a simplified diagrammatic illustration only and is not intended to be fully illustrative of the theatre. Rather, FIG. 1 merely shows the fact that screen 20 comprises a skeleton framework 24 and an array of panels 26 supported by the framework. In practice, the framework will be much more extensive than is shown in FIG. 1 and there will be a much larger number of panels. As indicated previously, for a domed diameter of 20 m diameter there may be some 300–400 panels each initially of 3 m×1 m size.

Figure 2:
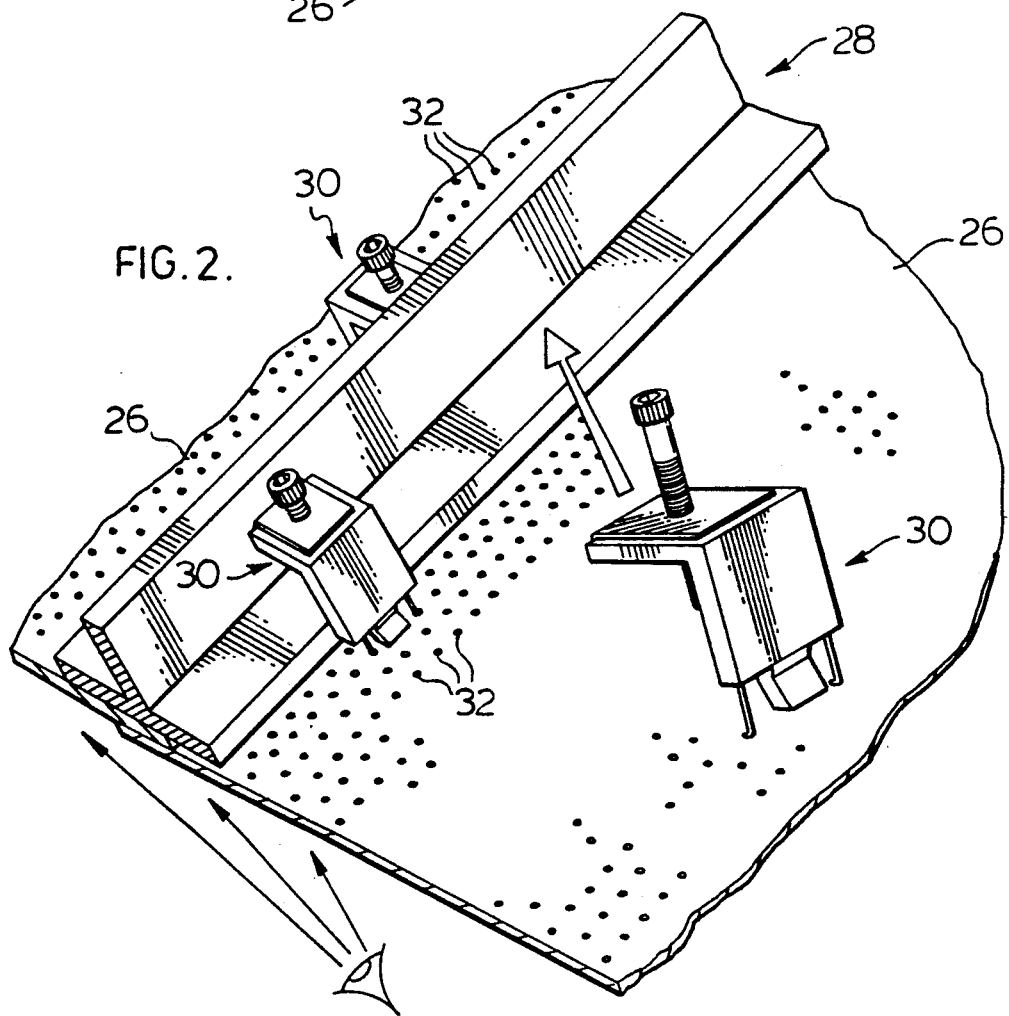
FIG. 2 is a detail perspective view illustrating the method of fastening panels that make up the screen shown in FIG. 1 to a supporting frame.

FIG. 2 shows, at 28, a portion of one of the individual members that make up the framework 24. It will be seen that the member is of T-shape in section and is oriented with the top limb of the T facing down. Fasteners securing the individual screen panels 26 against the outer surface of the top limb of the T-shaped member are individually denoted by reference numeral 30. In FIG. 2, two of the fasteners are shown installed, while a third fastener is shown in an "exploded" position preparatory to being installed.

Figure 3:
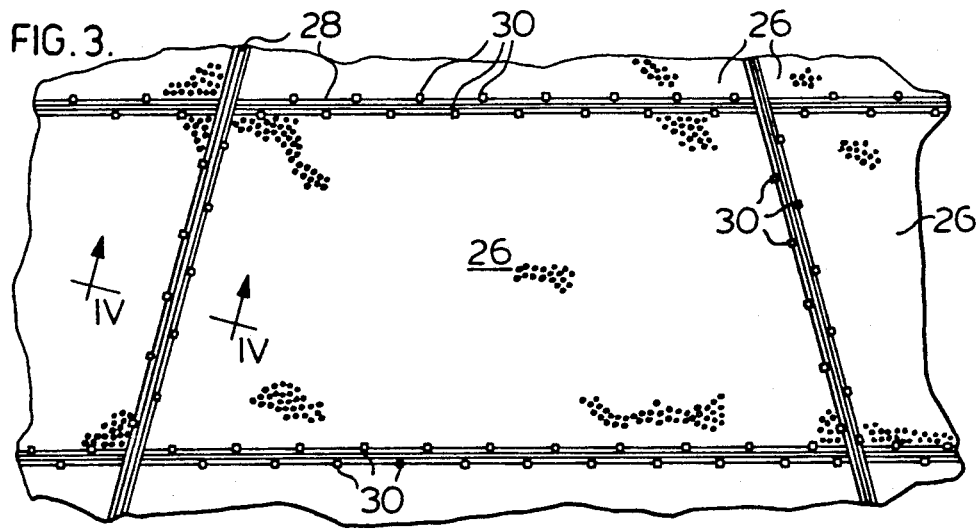
FIG. 3 is a detail elevational view showing one of the panels and the surrounding frame members.

FIG. 3 illustrates the fact that the framework 24 is designed to provide supporting frame members along all four margins of each panel. Again, individual fasteners of the form shown in FIG. 2 are denoted by reference numeral 30. For ease of illustration, the number of fasteners shown is less than would normally be used; in practise, fasteners probably would be provided at approximately 15 centimetre intervals along each margin of each panel.

FIG. 2 shows that adjacent panels are normally overlapped slightly below each frame member and that each panel is perforated over its whole surface to allow sound to pass through the screed as discussed previously. Reference numeral 32 denotes individual ones of the perforations. Typically, each panel is a thin aluminum sheet (approximately 1 mm thickness). Each perforation is circular and of a diameter of approximately 1.5 mm and the perforations are uniformly distributed over the sheet in rows with the rows parallel to the two edges of the sheet in its original rectangular form and the perforations in adjacent rows offset by one half of the pitch between each adjacent pair of perforations. In the rows parallel to the shorter dimension of the sheet, the pitch may be approximately 3 mm on centre while the pitch in the direction parallel to the longer edge of the sheet may be 6 mm on centre. While none of these dimensions are critical, they do illustrate the fact that the sheet is provided with a large number of relatively closely and uniformly spaced perforations. These perforations provide an almost infinite range of possible positions for the fasteners 30, as will become apparent.

Figure 5:
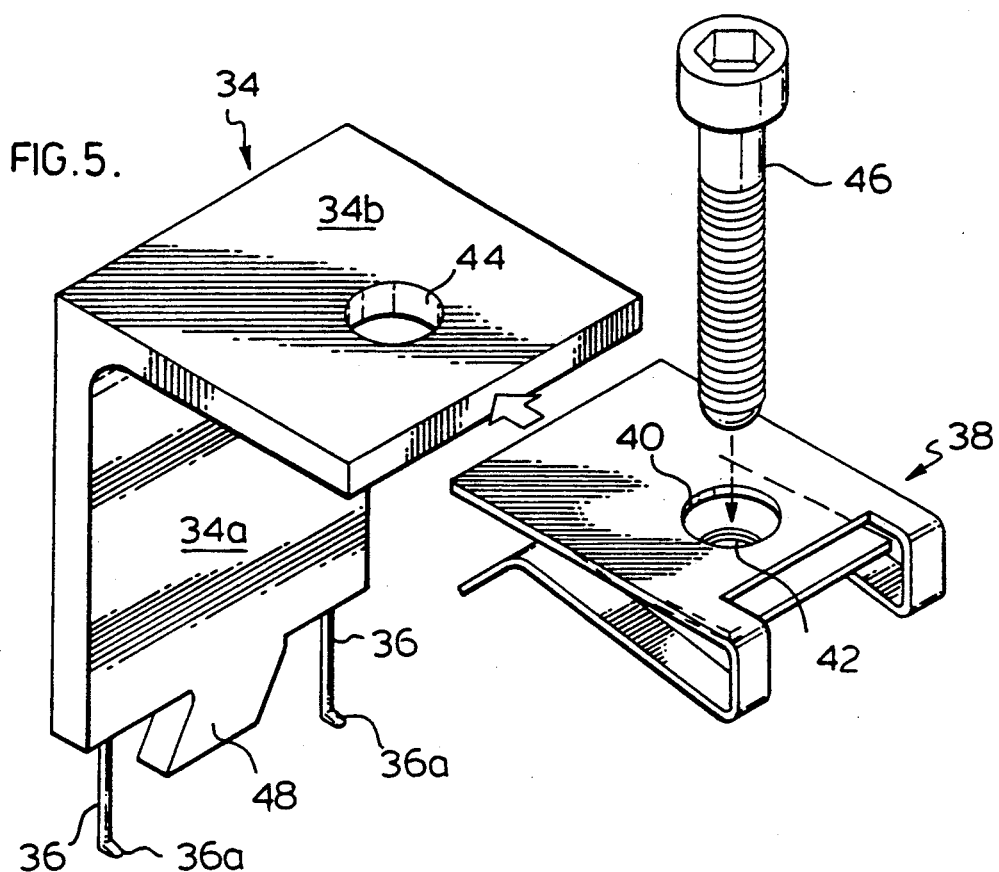
FIG. 5 is an exploded perspective view of one of the fasteners.
Figures 6A, 6B:
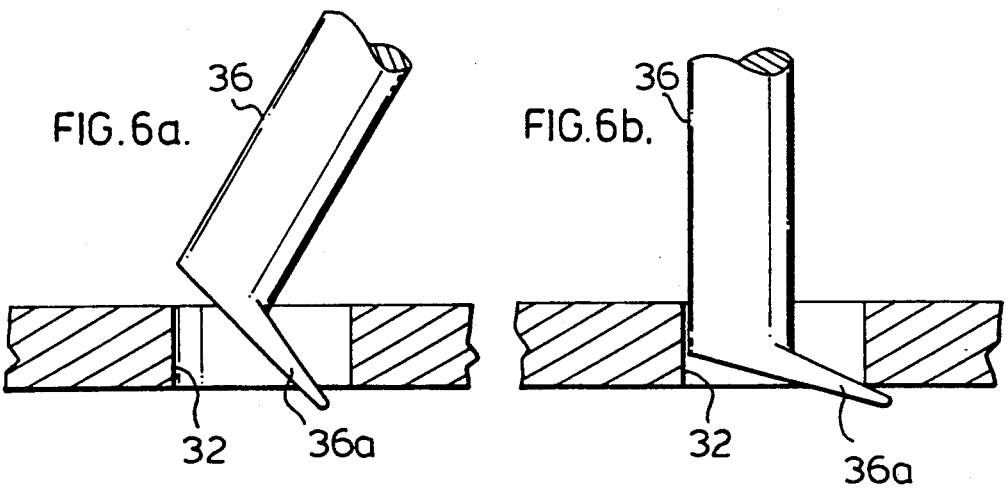
FIG. 6 comprises detail views denoted (a) and (b) illustrating insertion of one of the legs or "pins" of the fastener into a perforation in one of the panels; and, FIG. 7 is a perspective view from below corresponding to FIG. 6(b).

FIG. 5 is an exploded perspective view of one of the fasteners 30. The fastener has a body 34 comprising two rectangular limbs 34a and 34b disposed mutually at right angles. Limb 34a is intended to extend generally normal to the plane of the panel when the fastener is installed. At the bottom end of limb 34a, the fastener body is provided with panel-engaging means in the form of two spaced legs or pins 36 that are insertable into appropriately spaced ones of the perforations 32 in the panel 26. Each pin has a laterally directed outer end portion 36a that imparts a generally hook-shaped overall configuration to the pin so that each pin can be hooked into one of the perforations 32 as shown in FIGS. 6(a) and (b) and the panel thereby retained in engagement with the pins.

Limb 34b of the fastener body is fitted with a spring clip 38 designed to embrace and frictionally engage the limb. Clip 38 is provided with openings 40 and 42 which align with an opening 44 in limb 34b to accept a screw 46. The edges of the opening 42 in the lower part of the spring clip 38 are shaped to provide a partial screw thread so that the screw is in effect threaded to fastener body 34, providing clamping means engageable with the supporting framework 24 of the screen.

A tab 48 integrally formed at the lower end of the vertical limb 34a of the fastener body 34 is inclined in a direction away from screw 46 and provides bracing means for contact with the panel as best illustrated in FIG. 4.

In that view, two panels 26 are shown in marginally overlapping relationship below one of the T-section frame members 28. Two of the respective series of clips that would be used for the two panels are visible in FIG. 4. The clip denoted 30' is shown (in FIG. 4(a) to (c)) in the installed position while the other clip 30 is shown in a series of sequential positions it would adopt during installation.

Figure 4A:
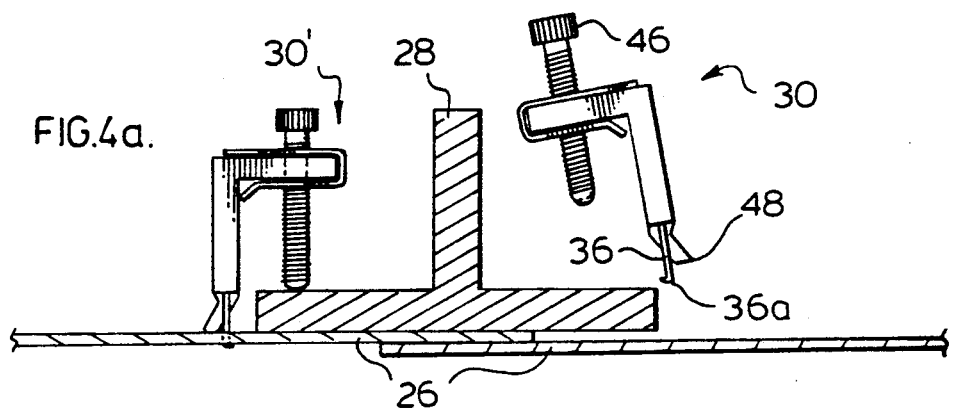
FIG. 4 comprises three sectional views denoted (a), (b) and (c), taken on line IV—IV in FIG. 3 and illustrating installation of a typical fastener used in the fastening method.
Figure 4B:
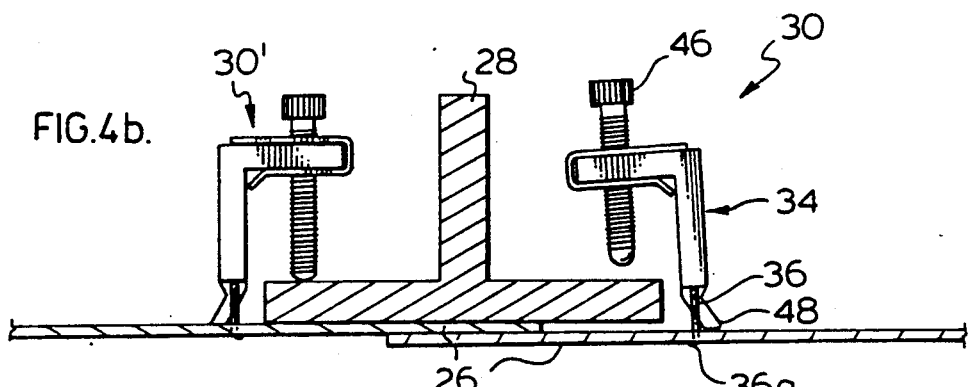

The first step in the installation process is to insert the two pins 36 through appropriate ones of the perforations 32 and in effect "hook" the end portions 36a of the pins through the perforations to the positions shown in FIG. 6(b). In order to accomplish this, it will be necessary to tilt the top portion of the fastener to the left as shown in FIGS. 4(a) and (b). It may be necessary to partially retract screw 46 in order to provide sufficient clearance for this to be done. Once this has been accomplished, the fastener is held with its upright limb 34a generally normal to the panel while screw 46 is tightened against the underside of the top limb of the support member 28 as indicated by arrow 50 in FIG. 4(c). As the screw bears against the support member 28, the fastener tends to rock in the clockwise direction as shown, about the lower ends of the pins 36 generally in the direction of arrow 52 in FIGS. 4(c). This rocking action is resisted by the bracing lug 48. Tightening proceeds until a comfortable equilibrium is reached at which the panel is firmly and snugly held in position but without distorting either the panel or the pins.

Figure 4C:
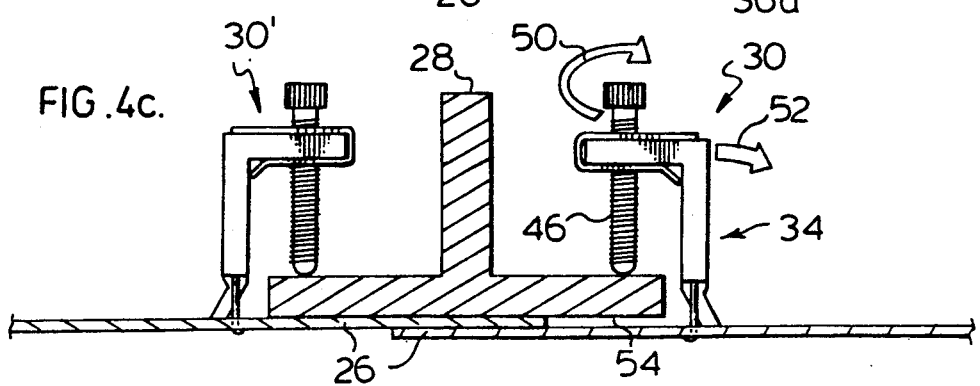

It would be possible to provide a projection on the fastener body that would enter the gap that is denoted 54 in FIG. 4(c) between the support member 28 and the panel 26 but in practice this has been found not to be required.

Figure 7:
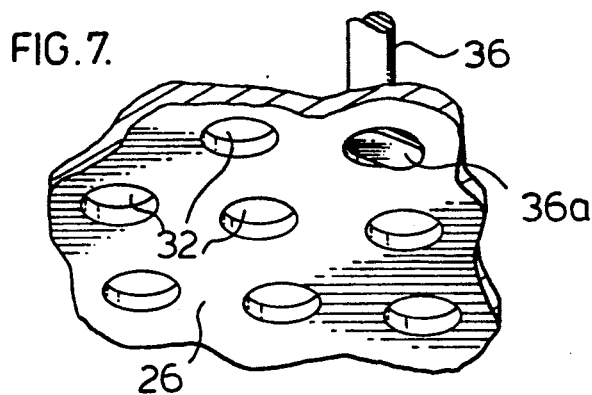

It will be appreciated from the forgoing that the fasteners 30 will be virtually invisible from the reflective side of the panels 26 onto which the motion picture is to be projected (the lower side in FIG. 4). The only parts of the fastener at that side of the panel are the outer end portions 36a of the pins and it will be seen from FIG. 7 that they are insignificantly small. In the clip as manufactured, the pins will normally be chemically treated to produce a black finish so that the end portions 36a will be indistinguishable from the perforations themselves as far as the audience is concerned. Further, the fasteners will not cause flattening or other distortion of the panels that is inherent in the rivet fastening method of the prior art. Once installed, the fasteners can accommodate temperature variations that cause limited dimensional changes in the components of the screen. The fasteners can also be adjusted to take care of greater changes, or if the positions of the panels need to be altered. Also, the screen could be disassembled and the fasteners and panels re-used. The installation process is also much less time consuming and inconvenient than the riveting and painting method described previously.

It will of course be appreciated that the preceding description relates to a particular preferred embodiment of the invention only and that many modifications are possible within the broad scope of the invention. For example, more than two or only a single panel engaging pin or other element could be employed. The configuration best seen in FIG. 6 with two pins one on either side of a bracing tab could be reversed so that there would be a single pin in the centre and two bracing tabs one on each side. Another possible modification is to replace a fixed bracing tab with, say a screw for providing adjustable bracing. This might be necessary if, for example, it were decided to arrange the "hooks" on the lower ends of the pins 36 so that they were oppositely directed from the arrangement shown. Other possible modifications would be to thread the screw 46 directly into the fastener body 34 and/or to change the shape or configuration of the fastener body itself.

The fastener could of course be used with non-perforated panels, although it would then be necessary to drill or otherwise form openings in the panels to accommodate the panel-engaging means.

It should finally be noted that the fastener and method of the invention could be used to construct projection screens other than dome-shaped screens i.e. screens of flat or other curved shapes.

I claim:

1. A projection screen panel fastener for securing a screen panel having first and second faces to a support located at said first face of the panel;
    the fastener comprising a fastener body provided with:
    panel engaging means insertable from said first face of the panel into an opening through the panel adjacent said support, said panel engaging means having an outer end portion shaped to project in a direction laterally of said opening at said second face of the panel, for retaining the panel in engagement with said panel engaging means;
    clamping means adapted to engage said support at a location spaced laterally of the panel engaging means and including a screw which can be tightened against said support to draw the panel towards the support; and,
    bracing means arranged for contact with said first face of the panel at a location spaced laterally of the panel engaging means in a direction opposite to said clamping means.

2. A projection screen panel fastener as claimed in claim 1, wherein said panel engaging means comprises a pair of spaced pins for engagement in a correspondingly spaced pair of said openings through the panel, and wherein said outer end portions of the respective pins comprise laterally deflected integrally formed end portions of the pins, whereby the pins and end portions define a hook-shaped configuration permitting the fastener to be hooked into said openings.

3. A projection screen panel fastener as claimed in claim 2, wherein said outer end portions of the pins extend towards said clamping means.

4. A projection screen panel fastener as claimed in claim 2, wherein said bracing means comprises a fixed tab disposed between said pins and having an outer end face for bracing engagement with the panel at said location spaced laterally of the panel engaging means.

5. A projection screen panel fastener as claimed in claim 2, wherein said fastener body comprises first and second limbs disposed mutually at right angles, wherein said pins project from an outer end of said first limb generally in alignment with the limb, whereby, when the fastener is installed, the first limb extends generally normal to the panel and the second limb extends generally parallel to the panel at a spacing therefrom.

6. A projection screen panel fastener as claimed in claim 2, for use with a said screen panel formed with an array of perforations arranged in a regular configuration comprising rows of said perforations with the perforations in each row spaced at a defined pitch, and wherein the pins are arranged at a said spacing corresponding to a multiple of said pitch.

7. A projection screen panel fastener as claimed in claim 5, wherein said clamping means comprises a clamping screw which extends through said second limb of the fastener body parallel to the first limb and spaced outwardly therefrom, the screw being screw-threadingly coupled to said second limb so that the screw can be advanced and retracted through the opening in said limb for clamping engagement with a said support.

8. A projection screen panel fastener as claimed in claim 5, wherein said bracing means comprising a tab integrally formed at said outer end of the first limb of the fastener body, said tab being inclined with respect to said limb so that the outer face of the tab is disposed at said location spaced laterally of the panel engaging means.

9. A projection screen comprising an external supporting frame defining the configuration of the screen and a plurality of panels each having first and second end faces and each being fastened to the frame with said first faces disposed towards the frame and said second faces disposed inwardly of the frame and defining a projection screen surface, wherein each said panel is fastened to the support by a fastener comprising a fastener body provided with:
  panel engaging means extending from said first face of the panel into an opening through the panel adjacent a supporting portion of the frame, said panel engaging means having an outer end portion which projects in a direction laterally of said opening at said second face of the panel, retaining the panel in engagement with the panel engaging means;
  clamping means engaging said portion of the supporting frame at a location spaced laterally of the panel engaging means and including a screw which can be tined against said support to draw the panel towards the support; and,
  bracing means arranged in contact with said first face of the panel at a location spaced laterally of the panel engaging means in a direction away from said pumping means.

10. A method of constructing a motion picture projection screen, comprising the steps of:
  providing a supporting frame which defines the configuration of the screen, and a plurality of screen panels, each having a first and second face; and,
  fastening each said panel to the frame by means of a plurality of fasteners, each comprising a fastener body provided with: panel engaging means insertable from said first face of the panel into an opening through the panel adjacent said support, said panel engaging means having an outer end portion shaped to project in a direction laterally of said opening at said second face of the panel, for retaining the panel in engagement with said panel engaging means; clamping means adapted to engage said support at a location spaced laterally of the panel engaging means and including a screw which can be tightened against said support to draw the panel towards the support; and, bracing means arranged for contact with said first face of the panel at a location spaced laterally of the panel engaging means in a direction opposite to said clamping means;
  each fastener being installed by first hooking said panel engaging means into a said opening through the panel, subsequently orienting the fastener approximately in the position to adopt in use, and finally tightening said screw against said support to an extent sufficient to firmly clamp the panel to the support without distorting the panel in the vicinity of said panel engaging means.

* * * * *